US010789854B1

(12) United States Patent
Kolesinski

(10) Patent No.: US 10,789,854 B1
(45) Date of Patent: Sep. 29, 2020

(54) GRAPHICAL DEPICTION OF AN EXCLUSION ZONE ON AN AIRPORT MOVEMENT SURFACE

(71) Applicant: Rockwell Collins, Inc., Cedar Rapids, IA (US)

(72) Inventor: Marcin Kolesinski, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/674,878

(22) Filed: Nov. 5, 2019

(51) Int. Cl.
  *G06G 7/76* (2006.01)
  *G08G 5/06* (2006.01)
  *G01S 19/51* (2010.01)
  *B64D 43/00* (2006.01)

(52) U.S. Cl.
  CPC .............. *G08G 5/065* (2013.01); *B64D 43/00* (2013.01); *G01S 19/51* (2013.01)

(58) Field of Classification Search
  CPC .... G08G 5/0047; G08G 5/065; G08G 5/0021; G01C 21/00; G01C 23/00; B64D 45/00; G01S 19/51
  See application file for complete search history.

(56) References Cited

U.S. PATENT DOCUMENTS

| 7,499,794 B1* | 3/2009 | Bailey | G01C 23/005 340/961 |
| 7,974,773 B1 | 7/2011 | Krenz et al. | |
| 8,560,214 B1 | 10/2013 | Krenz et al. | |
| 9,487,304 B1 | 11/2016 | Bowen et al. | |
| 9,779,630 B2 | 10/2017 | Auletto et al. | |
| 2008/0191902 A1* | 8/2008 | Kolb | G08G 5/006 340/945 |
| 2010/0250030 A1 | 9/2010 | Nichols et al. | |
| 2011/0196598 A1* | 8/2011 | Feyereisen | G08G 5/0021 701/120 |
| 2013/0113819 A1* | 5/2013 | Gurusamy | G08G 5/0021 345/592 |
| 2013/0231853 A1 | 9/2013 | Feyereisen et al. | |
| 2014/0354456 A1* | 12/2014 | Gannon | G08G 5/025 340/972 |
| 2016/0343262 A1 | 11/2016 | Auletto et al. | |

FOREIGN PATENT DOCUMENTS

EP 2854119 B1 8/2016

* cited by examiner

*Primary Examiner* — Hongmin Fan
(74) *Attorney, Agent, or Firm* — Suiter Swantz pc llo

(57) ABSTRACT

A graphical depiction of an exclusion zone on an airport movement surface is disclosed. The graphical depiction may be displayed on a display device of an aircraft. The display device may be further configured to display an aircraft ownship symbol. A location of the aircraft ownship symbol on the display device may be dependent on one or more signals related to the location of the aircraft relative to the airport movement surface. The display device of the aircraft may be configured to exit a taxi mode or enter the taxi mode based on a comparison between the exclusion zone and the one or more received signals.

15 Claims, 7 Drawing Sheets

GRAPHICAL DEPICTION OF AN EXCLUSION ZONE ON AN AIRPORT MOVEMENT SURFACE

BACKGROUND

Aircraft employ synthetic vision systems (SVS) in low-visibility situations to assist in determining the location of the aircraft during taxiing. A low-visibility situation may prevent crew members from being able to see airport movement surfaces via line-of-sight through the windows during taxiing. During taxiing, the SVS may enter into or exit out of an SVS Taxi Mode, depending on whether the aircraft is located on the airport movement surfaces.

SUMMARY

A graphical depiction of an exclusion zone on an airport movement surface is disclosed, in accordance with one or more embodiments of the disclosure. The graphical depiction may be displayed on a display device of an aircraft. The display device may be further configured to display an aircraft ownship symbol. A location of the aircraft ownship symbol on the display device may be dependent on one or more signals related to the location of the aircraft relative to the airport movement surface. The display device of the aircraft may be configured to exit a taxi mode or enter the taxi mode based on a comparison between the exclusion zone and the one or more received signals.

A method is disclosed, in accordance with one or more embodiments of the disclosure. The method may include, but is not limited to, displaying an exclusion zone on a display device of an aircraft. The method may include, but is not limited to, receiving one or more signals related to a location of the aircraft relative to an airport movement surface. The method may include, but is not limited to, displaying an aircraft ownship symbol on the display device based on the location of the aircraft. A location of the aircraft ownship symbol on the display device may be dependent on the one or more signals related to the location of the aircraft relative to the airport movement surface. The method may include, but is not limited to, comparing the one or more signals to the exclusion zone. The method may include, but is not limited to, entering a taxi mode on the display device or exiting the taxi mode on the display device based on the comparison.

In some embodiments, the exclusion zone and the aircraft ownship symbol may be overlaid on a synthetic vision system (SVS) Taxi scene.

In some embodiments, the exclusion zone and the aircraft ownship symbol may be overlaid on a top-down airport moving map (AMM) of the airport movement surface.

In some embodiments, the aircraft may be located outside the exclusion zone based on the comparison between the one or more signals and the exclusion zone. The display device may be in taxi mode when the aircraft is located outside the exclusion zone.

In some embodiments, the display device may be configured to exit the taxi mode when the aircraft crosses a trigger point of the exclusion zone as determined via the comparison.

In some embodiments, the display device may be configured to automatically exit the taxi mode when the aircraft crosses the trigger point of the exclusion zone as determined via the comparison.

In some embodiments, the display device may be configured to exit the taxi mode when the aircraft crosses the trigger point of the exclusion zone as determined via the comparison following an input being received via at least one input device of the aircraft.

In some embodiments, the aircraft may be located within the exclusion zone based on the comparison between the one or more signals and the exclusion zone.

In some embodiments, the display device may be configured to enter taxi mode when the aircraft crosses a trigger point of the exclusion zone as determined via the comparison.

In some embodiments, the display device may be configured to automatically enter the taxi mode when the aircraft crosses the trigger point of the exclusion zone as determined via the comparison.

In some embodiments, the display device may be configured to enter the taxi mode when the aircraft crosses the trigger point of the exclusion zone as determined via the comparison following an input being received via at least one input device of the aircraft.

In some embodiments, the exclusion zone may be an expansion of a departure runway highlight area.

In some embodiments, the display device of the aircraft displaying the exclusion zone and the aircraft ownship symbol may be a primary display device of the aircraft. The exclusion zone may correspond to one or more secondary symbols or one or more textual indicators displayed on a secondary display device of the aircraft. The one or more secondary symbols or one or more textual indicators may be configured to provide information about at least one of the trigger point of the exclusion zone or the location of the aircraft ownship symbol relative to the exclusion zone.

In some embodiments, the one or more signals may include a global positioning system (GPS) signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
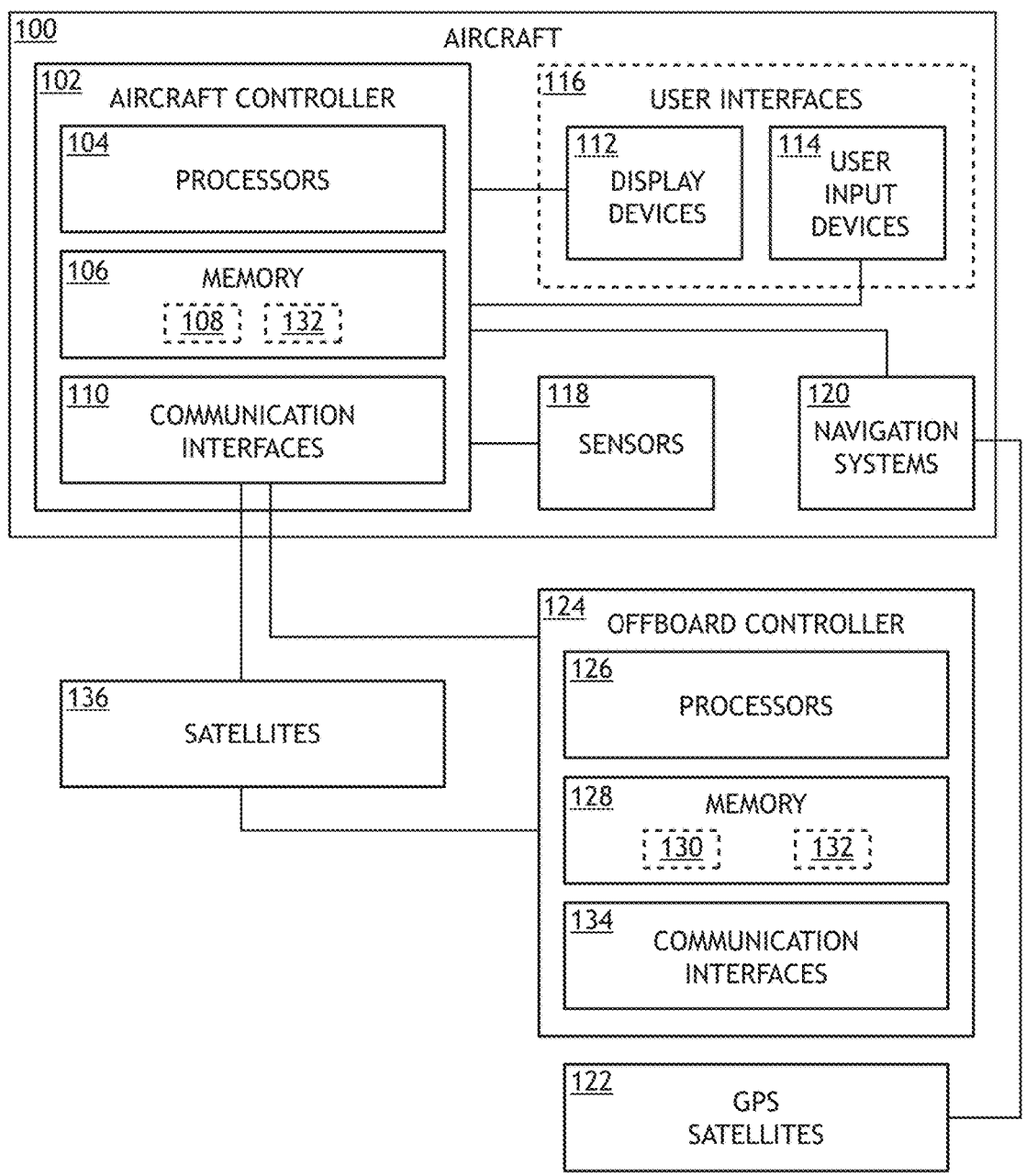
FIG. 1A is a block diagram of a system including an aircraft in which a graphical depiction of an exclusion zone on an airport movement surface may be displayed, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1A-4 generally illustrate a graphical depiction of an exclusion zone on an airport movement surface, in accordance with one or more embodiments of the disclosure.

Figure 1B:
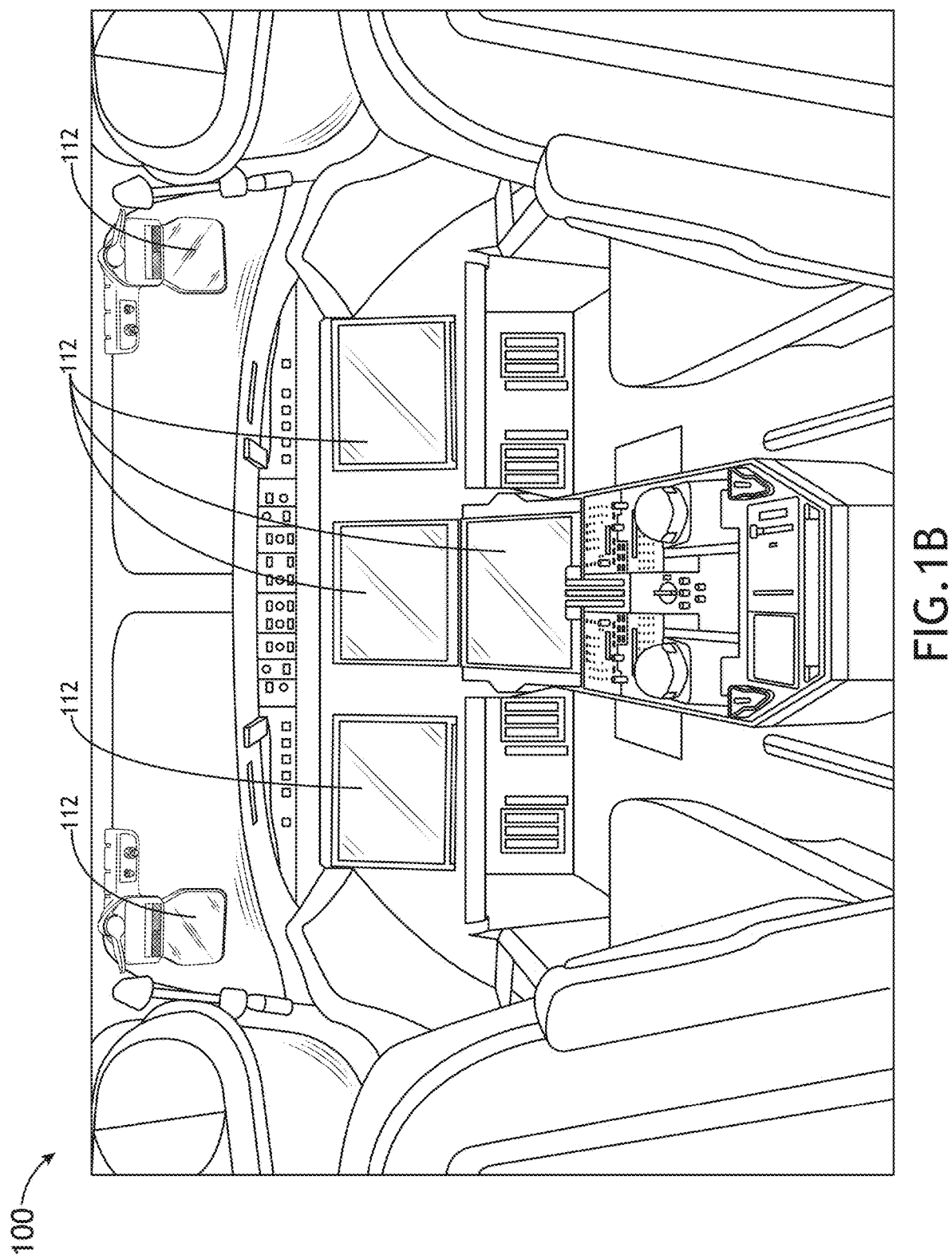
FIG. 1B is an aircraft in which a graphical depiction of an exclusion zone on an airport movement surface may be displayed, in accordance with one or more embodiments of the disclosure.
Figure 1C:
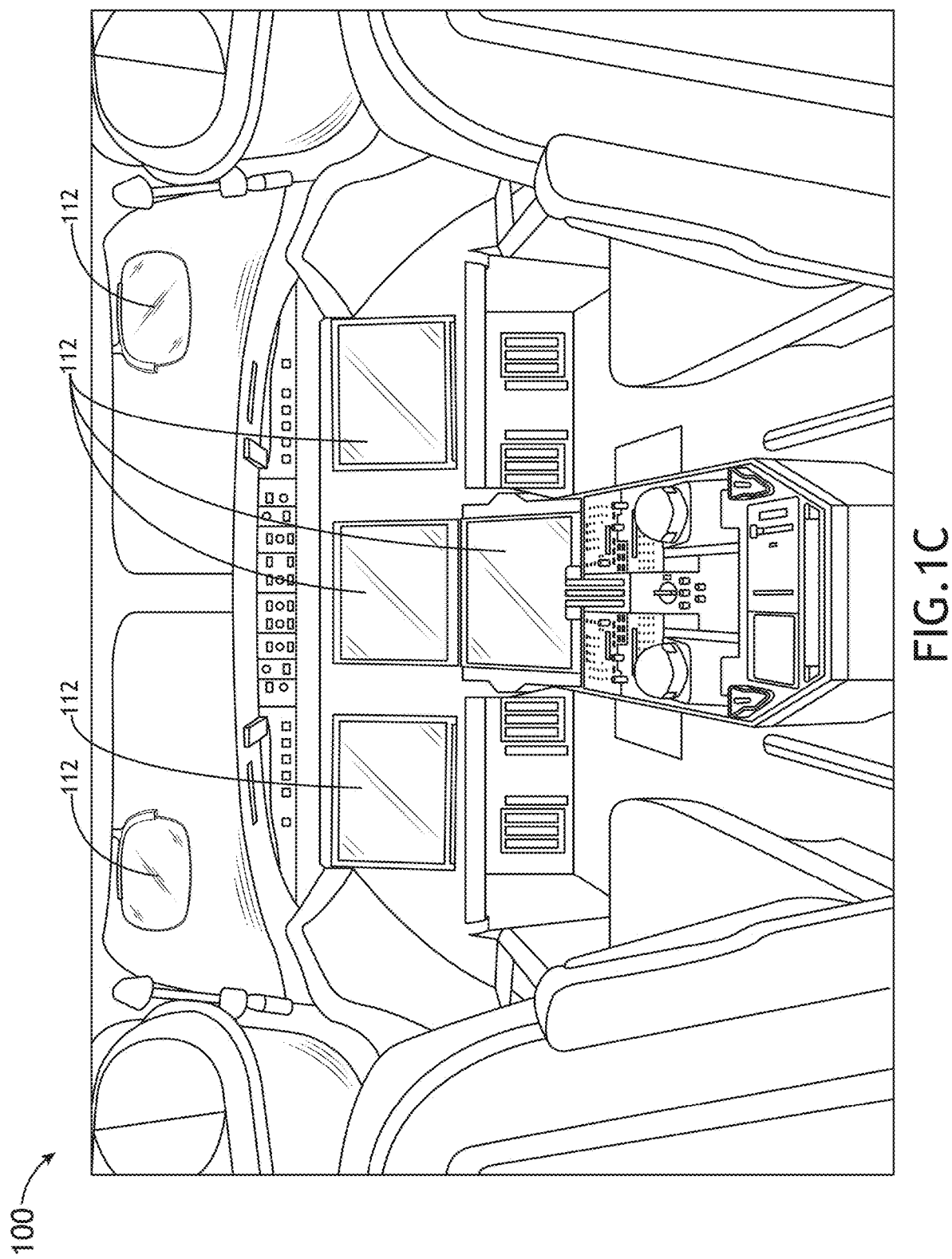
FIG. 1C is an aircraft in which a graphical depiction of an exclusion zone on an airport movement surface may be displayed, in accordance with one or more embodiments of the disclosure.

FIGS. 1A-1C generally illustrate an aircraft 100 in which a graphical depiction of an exclusion zone on an airport movement surface may be generated and/or displayed, in accordance with one or more embodiments of the disclosure.

Referring now to FIG. 1A, the aircraft 100 may include an aircraft controller 102. The aircraft controller 102 may include one or more processors 104, memory 106 configured to store one or more program instructions 108, and/or one or more communication interfaces 110.

Figure 2:
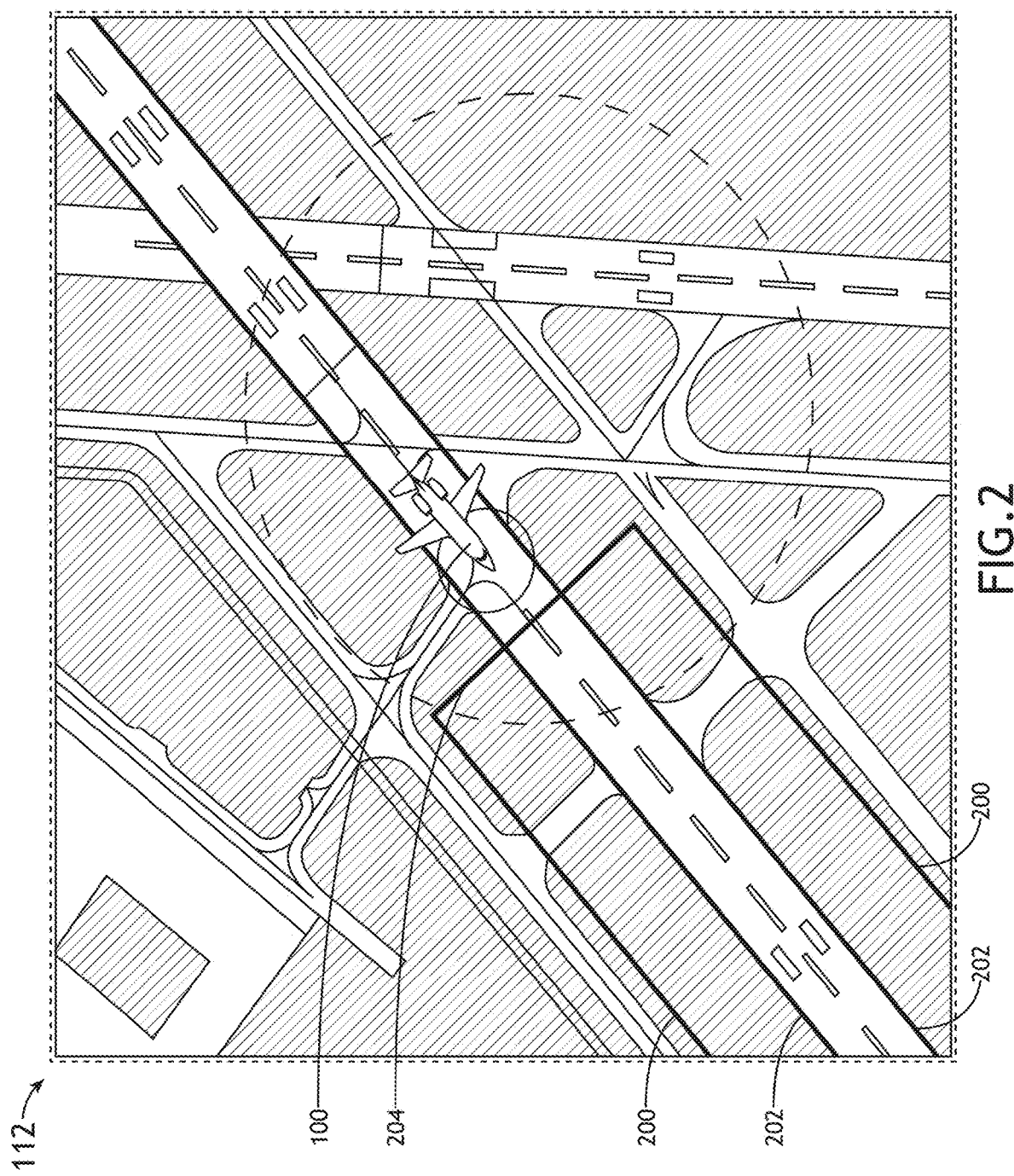
FIG. 2 is a graphical representation of a front view of portions of an avionics display screen showing a graphical depiction of an exclusion zone on an airport movement surface, in accordance with one or more embodiments of the disclosure.
Figure 3A:
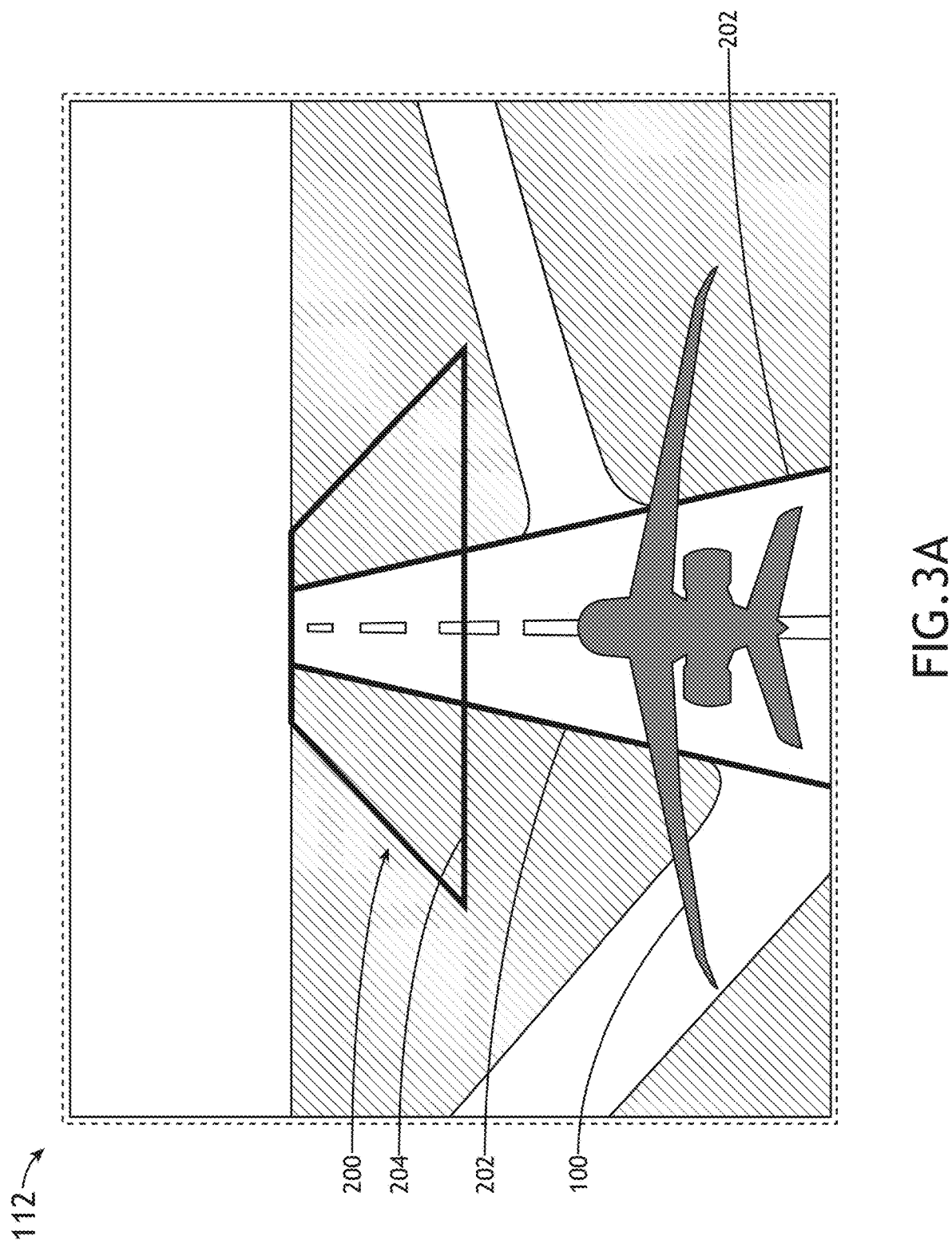
FIG. 3A is a graphical representation of a front view of portions of an avionics display screen showing a graphical depiction of an exclusion zone on an airport movement surface, in accordance with one or more embodiments of the disclosure.
Figure 3B:
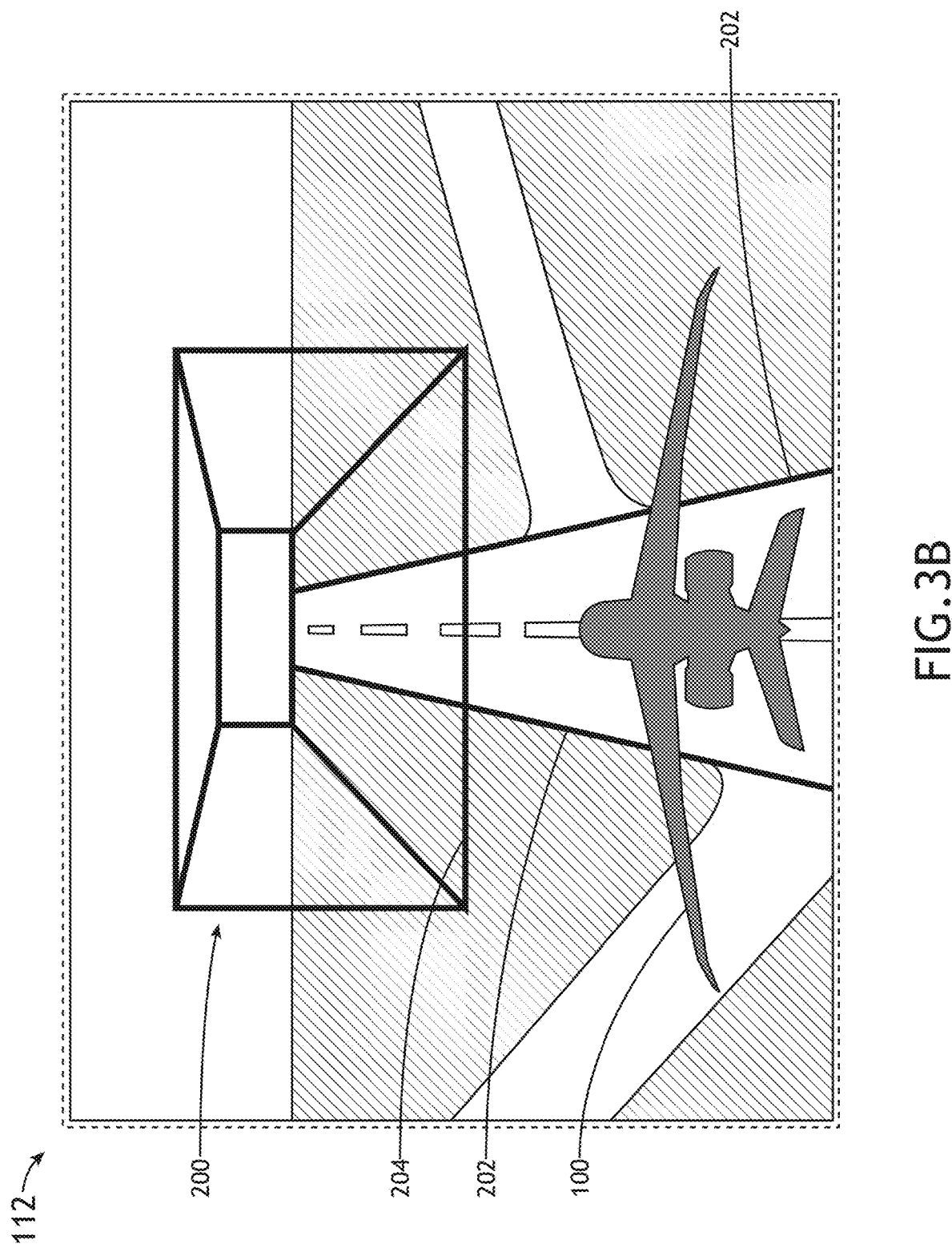
FIG. 3B is a graphical representation of a front view of portions of an avionics display screen showing a graphical depiction of an exclusion zone on an airport movement surface, in accordance with one or more embodiments of the disclosure.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images (e.g., as part of a Synthetic Vision System, or SVS) and/or two-dimensional images (e.g., a top-down airport moving map, or AMM). Referring now to FIGS. 1B and 1C, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), or the like. For example, select display devices 112 may be considered primary display devices 112 (e.g., primary flight displays, or PFDs), and select additional display devices 112 may be considered secondary display devices 112. For instance, the primary display devices 112 may be configured to display an exclusion zone 200, as illustrated in FIGS. 2, 3A, and 3B, while the select additional display devices 112 may be configured to display one or more secondary symbols and/or one or more textual indicators with information about a boundary or trigger point of the exclusion zone 200 and/or the location of the aircraft 100 (e.g., as represented by an aircraft ownship symbol) relative to the exclusion zone. The one or more display devices 112 may be employed to present flight data including, but not limited to, situational awareness data and/or flight queue data to a pilot or other crew member. For example, the situational awareness data may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, the one or more common user interfaces 116, and/or one or more offboard controllers 124 may be standalone components. It is noted herein, however, that the aircraft controller 102, the one or more common user interfaces 116, and/or the one or more offboard controllers 124 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more global positioning system (GPS) satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124. For example, the one or more offboard controllers 124 may be in possession of an air traffic control tower, in possession of an offboard ground maintenance crew, in possession of a manufacturing line operator, in possession of a quality control tester, or the like.

The one or more offboard controllers 124 may include one or more processors 126, memory 128 configured to store one or more programs instructions 130 and/or one or more databases 132, and/or one or more communication interfaces 134. The one or more databases 132 may be transmitted to the aircraft controller 102.

The one or more databases 132 may be transmitted to the aircraft controller 102. The one or more databases 132 may include information about an airport movement surface (e.g., an exclusion zone around departure runways), information about a flight plan of the aircraft 100 (e.g., taxi route, flight plan progress, or the like), or the like.

The aircraft controller 102 and/or the one or more offboard controllers 124 may be coupled (e.g., physically, electrically, and/or communicatively) to one or more satellites 136. For example, the aircraft controller 102 and/or the one or more offboard controllers 124 may be coupled (e.g., physically, electrically, and/or communicatively) to one another via the one or more satellites 136. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 136 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 4:
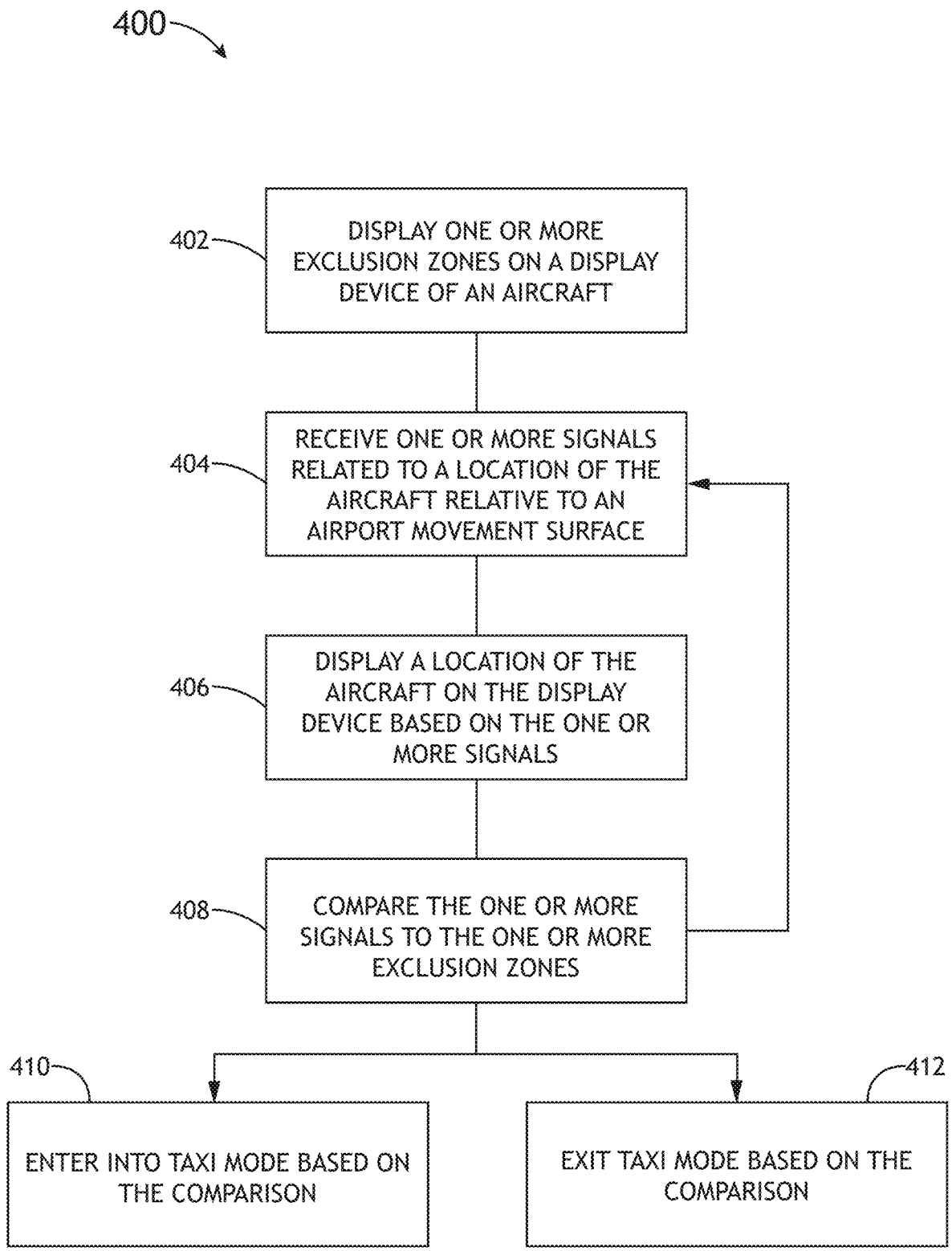
FIG. 4 is a flow diagram of a method or process for generating a graphical depiction of an exclusion zone on an airport movement surface, in accordance with one or more embodiments of the disclosure.

FIGS. 2, 3A, and 3B generally illustrate graphical representations of a front view of portions of an avionics display screen showing a graphical depiction of an exclusion zone on an airport movement surface, in accordance with one or more embodiments of the disclosure. FIG. 4 illustrates a flow diagram for a graphical representation of a front view of portions of an avionics display screen showing a graphical depiction of an exclusion zone on an airport movement surface, in accordance with one or more embodiments of the disclosure.

An airport moving map (AMM) and/or a Synthetic Vision System (SVS) may be employed to assist in determining the location of the aircraft during taxiing. The AMM and/or the SVS may provide situational awareness to crew members operating an aircraft by using databases including terrain, obstacle, geo-political, hydrological, or other environment information to generate graphical representations of the surrounding area during taxiing.

It may be desirable for an aircraft controller 102 to enter into or exit from taxi mode automatically or with minimal manual intervention (e.g., when approaching hold locations on an airport movement surface). The automatic transition may be accomplished based on information about a flight plan of the aircraft 100 (e.g., taxi route, flight plan progress, or the like). This information, however, may be expensive and/or may be protected to prevent possible interference with the aircraft 100. In addition, the automatic transition may be accomplished based on information about an airport movement surface, such as a pre-defined exclusion zone around a departure runway. The pre-defined exclusion zone may be confusing, however, as it may not be readily apparent when or why the system entered into or exited from taxi mode. For example, the switching into and out of taxi mode may be triggered by parallel runways and/or when crossing over a departure runway on the airport movement surface to continue taxiing beyond the departure runway. As such, it would be desirable to provide a graphical depiction of an exclusion zone on an airport movement surface.

A graphical depiction of an exclusion zone on an airport movement surface may be provided in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), International Civil Aviation Organization (ICAO), or any other standards setting organization or company; the Radio Technical Commission for Aeronautics (RTCA) or any other guidelines agency or organization; or the like.

Select SVS systems display an aircraft ownship symbol depicting or representing the aircraft 100 on a primary display device 112, where the aircraft ownship symbol illustrates the location of the aircraft on an airport movement surface. For example, the aircraft ownship symbol may include an outlined representation of the aircraft 100 imposed over the airport movement surface on the display device 112. For instance, the aircraft ownship symbol may be overlaid on a top-down airport moving map (AMM) of the airport movement surface. In addition, the aircraft ownship symbol may be overlaid in an SVS Taxi scene of the airport movement surface.

As illustrated in FIG. 2, a graphical depiction of an exclusion zone 200 may be overlaid on the top-down airport moving map (AMM) of the airport movement surface displayed on a display device 112 of an aircraft 100. The aircraft 100 may be shown within the airport moving map. The exclusion zone 200 may be an overlay on the airport moving map. For example, the exclusion zone 200 may be a transparent overlay on the airport moving map. By way of another example, the exclusion zone 200 may be a lined graphic overlay (e.g., a solid-lined graphic overlay) on the airport moving map. The exclusion zone 200 may be an expansion of a departure runway highlight area 202. For example, the departure runway highlight area 202 may be a transparent overlay on the airport moving map. By way of another example, the departure runway highlight area 202 may be a lined graphic overlay (e.g., a solid-lined graphic overlay) on the airport moving map. The exclusion zone 200 may include a trigger point 204 where the aircraft 100 (e.g., an aircraft controller 102 of the aircraft 100) may enter into or exit from taxi mode.

As illustrated in FIGS. 3A and 3B, a graphical depiction of the exclusion zone 200 for SVS Taxi Mode may be overlaid into the SVS Taxi scene of the airport movement surface displayed on a display device 112 of an aircraft 100. The aircraft 100 may be shown within the SVS Taxi scene. The exclusion zone 200 may be an overlay in the SVS Taxi scene. For example, the exclusion zone 200 may be a transparent overlay in the SVS Taxi scene. By way of another example, the exclusion zone 200 may be a lined graphic overlay (e.g., a solid-lined graphic overlay) in the SVS Taxi scene. The exclusion zone 200 may be an expansion of a departure runway highlight area 202. For example, the departure runway highlight area 202 may be a transparent overlay in the SVS Taxi scene. By way of another example, the departure runway highlight area 202 may be a lined graphic overlay (e.g., a solid-lined graphic overlay) in the SVS Taxi scene. The exclusion zone 200 may include the trigger point 204 where the aircraft 100 (e.g., an aircraft controller 102 of the aircraft 100) may enter into or exit from taxi mode.

Referring now to FIG. 3A, the graphical depiction of the exclusion zone 200 for SVS Taxi Mode with the trigger point 204 may be a flat or two-dimensional (2D) area projected around the departure runway highlight area 202.

Referring now to FIG. 3B, in another example the graphical depiction of the exclusion zone 200 for SVS Taxi Mode with the trigger point 204 may be a three-dimensional (3D) volume extending above the departure runway highlight area 202, where a bottom surface of the 3D volume may be a flat or two-dimensional (2D) area projected around the departure runway highlight area 202.

It is noted herein that either the 2D area representation or the 3D volume representation of the exclusion zone 200 for SVS Taxi Mode may be set as the default view. In addition, it is noted herein that a user (e.g., pilot or other crew member) may switch between the 2D area and the 3D volume representations of the exclusion zone 200 for SVS Taxi Mode (e.g., via the one or more common user interfaces 116 including the one or more display devices 112 and/or the one or more user input devices 114, where the user may interact with the one or more display devices 112 and/or the one or more user input devices 114).

It is believed that generating a graphical depiction of an exclusion zone on an airport movement surface may allow for a simple and/or intuitive determination of the trigger point 204 where an aircraft 100 (e.g., an aircraft controller 102 of the aircraft 100) may enter into or exit from taxi mode. Being able to see the trigger point 204 may allow for confusion to be avoided (e.g., as to why the display device 112 (e.g., a primary display device 112) either entered into or exited from taxi mode). It is noted herein that the exclusion zone 200 may be complemented by a message and/or other symbology displayed on a secondary display device 112, allowing for a primary display device 112 including the exclusion zone 200 to remain decluttered.

FIG. 4 illustrates a method or process 400 for generating a graphical depiction of an exclusion zone on an airport movement surface, in accordance with one or more embodiments of the disclosure. The aircraft controller 102 may employ a series of algorithms to generate the graphical depiction of an exclusion zone on an airport movement surface. The series of algorithms may be process steps as defined by the one or more sets of program instructions 108.

In a step 402, one or more exclusion zones are displayed on a display device of an aircraft. One or more databases 132 may be received by the aircraft controller 102 of the aircraft 100. The series of algorithms may generate an exclusion zone on a display device 112 of an aircraft 100 from the one or more databases 132. For example, the one or more databases 132 may include information about an airport movement surface such as a location of one or more exclusion zones around departure runways. By way of another example, the one or more databases 132 may include information about a flight plan of the aircraft 100 such as a taxi route or flight plan progress, or the like. The aircraft controller 102 may be configured to store the one or more databases 132 (e.g., within memory 106). The one or more databases 132 may be pre-loaded onto the aircraft controller 102 prior to a flight (e.g., between flights, during in-field testing or operation of the aircraft 100, during manufacture and/or factory-floor testing of the aircraft 100, or the like). The aircraft controller 102 may be configured to receive the one or more databases 132 from an offboard controller 124 during a portion of a flight.

In a step 404, one or more signals related to a location of an aircraft relative to an airport movement surface may be received. For example, the one or more signals may be received from the one or more GPS satellites 122 (e.g., via the one or more navigation systems 120 of the aircraft 100). By way of another example, the one or more signals may be received from the one or more offboard controllers 124 (e.g., either indirectly via the one or more satellites 136 or directly).

In a step 406, a location of the aircraft on the display device is displayed based on the one or more signals. The updating of the location may move the aircraft 100 closer to the trigger point 204 of the exclusion zone 200 while the aircraft 100 is outside of the exclusion zone 200 (e.g., is in taxi mode). The updating of the location may move the aircraft 100 closer to the trigger point 204 of the exclusion zone 200 while the aircraft 100 is inside the exclusion zone 200 (e.g., is not in taxi mode).

In a step 408, the one or more signals may be compared to the one or more exclusion zones. The series of algorithms may determine whether the aircraft 100 is within the exclusion zone 200. The series of algorithms may determine whether the aircraft 100 is outside the exclusion zone 200.

Where the series of algorithms determines the aircraft 100 has remained in the same location relative to the boundaries or trigger points of the exclusion zone 200 (e.g., within the exclusion zone 200 or outside of the exclusion zone 200), the taxi mode of the display device 112 is not changed. Where the series of algorithms determines the aircraft 100 has not remained in the same location relative to the boundaries or trigger points of the exclusion zone 200, however, the taxi mode of the display device 112 is changed.

In a step 410, a taxi mode may be entered based on the comparison. The series of algorithms may determine the aircraft 100 has crossed the trigger point 204 into the exclusion zone 200 stored in the one or more databases 132. Upon reaching this determination, the series of algorithms may automatically exit taxi mode. For example, the taxi mode may be the SVS Taxi Mode. By way of another example, the taxi mode may be a top-down Airport Movement Surface (AMS) taxi mode.

In a step 412, a taxi mode may be exited based on the comparison. The series of algorithms may determine the aircraft 100 has crossed the trigger point 204 out of the exclusion zone 200 stored in the one or more databases 132. Upon reaching this determination, the series of algorithms may automatically enter taxi mode. For example, the taxi mode may be the SVS Taxi Mode. By way of another example, the taxi mode may be a top-down Airport Movement Surface (AMS) taxi mode.

Although embodiments of the disclosure include the series of algorithms being configured to automatically enter into or exit from a taxi mode, it is noted herein the series of algorithms may be configured to exit from a taxi mode following an input being received from the one or more display devices 112 and/or the one or more user input devices 114. For example, the input may be generated based on the displayed aircraft ownship symbol representing the aircraft 100 being displayed as having crossed the trigger point 204 into the exclusion zone 200.

Although embodiments of the disclosure illustrate the series of algorithms as being configured to automatically enter into or exit from a taxi mode, it is noted herein the series of algorithms may be configured to enter into a taxi mode following an input being received from the one or more display devices 112 and/or the one or more user input devices 114. For example, the input may be generated based on the displayed aircraft ownship symbol representing the aircraft 100 being displayed as having crossed the trigger point 204 out from the exclusion zone 200.

It is noted herein the automatic entering into or exiting from a taxi mode may be paired with one or more secondary symbols and/or one or more textual indicators displayed on a secondary display device 112. For example, the one or more secondary symbols and/or one or more textual indicators may be placeable in a message box, title bar, or another location on the one or more display devices 112, to prevent a cluttering of the space around the aircraft ownship symbol 100 on the primary display device 112. Therefore, the above description should not be interpreted as a limitation on the scope of the present disclosure but merely an illustration.

It is noted herein the process 400 is not limited to the steps and/or sub-steps provided. The process 400 may include more or fewer steps and/or sub-steps. The process 400 may perform the steps and/or sub-steps simultaneously. The process 400 may perform the steps and/or sub-steps sequentially, including in the order provided or an order other than provided. Therefore, the above description should not be interpreted as a limitation on the scope of the disclosure but merely an illustration Although embodiments of the present disclosure are directed to the aircraft controller 102 receiving the one or more databases 132 and automatically entering into or exiting from a taxi mode via a series of algorithms that are process steps as defined by the one or more sets of program instructions 108, it is noted herein that the one or more offboard controllers 124 may be configured to determine whether the aircraft 100 has entered into or exited from the exclusion zone 200 via one or more steps of the process 400, employing a series of algorithms that are process steps as defined by the one or more sets of program instructions 130, before transmitting data about location relative to the exclusion zone 200 and/or instructions to automatically enter into or exit from a taxi mode to the aircraft controller 102. Therefore, the above description should not be interpreted as a limitation on the scope of the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A graphical depiction of an exclusion zone on an airport movement surface, the graphical depiction being displayed on a display device of an aircraft, the display device further configured to display an aircraft ownship symbol, a location of the aircraft ownship symbol on the display device being dependent on one or more signals related to the location of the aircraft relative to the airport movement surface,
   the display device of the aircraft configured to exit a taxi mode or enter the taxi mode based on a comparison between the exclusion zone and the one or more received signals.

2. A method comprising:
   displaying an exclusion zone on a display device of an aircraft;
   receiving one or more signals related to a location of the aircraft relative to an airport movement surface;
   displaying an aircraft ownship symbol on the display device based on the location of the aircraft, a location of the aircraft ownship symbol on the display device being dependent on the one or more signals related to the location of the aircraft relative to the airport movement surface;
   comparing the one or more signals to the exclusion zone; and
   entering a taxi mode on the display device or exiting the taxi mode on the display device based on the comparison.

3. The method of claim 2, the exclusion zone and the aircraft ownship symbol being overlaid on a synthetic vision system (SVS) Taxi scene.

4. The method of claim 2, the exclusion zone and the aircraft ownship symbol being overlaid on a top-down airport moving map (AMM) of the airport movement surface.

5. The method of claim 2, the aircraft being located outside the exclusion zone based on the comparison between the one or more signals and the exclusion zone, the display device being in taxi mode when the aircraft is located outside the exclusion zone.

6. The method of claim 5, the display device being configured to exit the taxi mode when the aircraft crosses a trigger point of the exclusion zone as determined via the comparison.

7. The method of claim 6, the display device being configured to automatically exit the taxi mode when the aircraft crosses the trigger point of the exclusion zone as determined via the comparison.

8. The method of claim 6, the display device being configured to exit the taxi mode when the aircraft crosses the trigger point of the exclusion zone as determined via the comparison following an input being received via at least one input device of the aircraft.

9. The method of claim 2, the aircraft being located within the exclusion zone based on the comparison between the one or more signals and the exclusion zone.

10. The method of claim 9, the display device being configured to enter the taxi mode when the aircraft crosses a trigger point of the exclusion zone as determined via the comparison.

11. The method of claim 10 the display device being configured to automatically enter the taxi mode when the aircraft crosses the trigger point of the exclusion zone as determined via the comparison.

12. The method of claim 10, the display device being configured to enter the taxi mode when the aircraft crosses the trigger point of the exclusion zone as determined via the comparison following an input being received via at least one input device of the aircraft.

13. The method of claim 2, the exclusion zone being an expansion of a departure runway highlight area.

14. The method of claim 2, the display device of the aircraft displaying the exclusion zone and the aircraft ownship symbol being a primary display device of the aircraft,
   the exclusion zone corresponding to one or more secondary symbols or one or more textual indicators displayed on a secondary display device of the aircraft,
   the one or more secondary symbols or the one or more textual indicators being configured to provide information about at least one of a trigger point of the exclusion zone or a location of the aircraft ownship symbol relative to the exclusion zone.

15. The method of claim 2, the one or more signals including a global positioning system (GPS) signal.

* * * * *